3,803,205
Patented Apr. 9, 1974

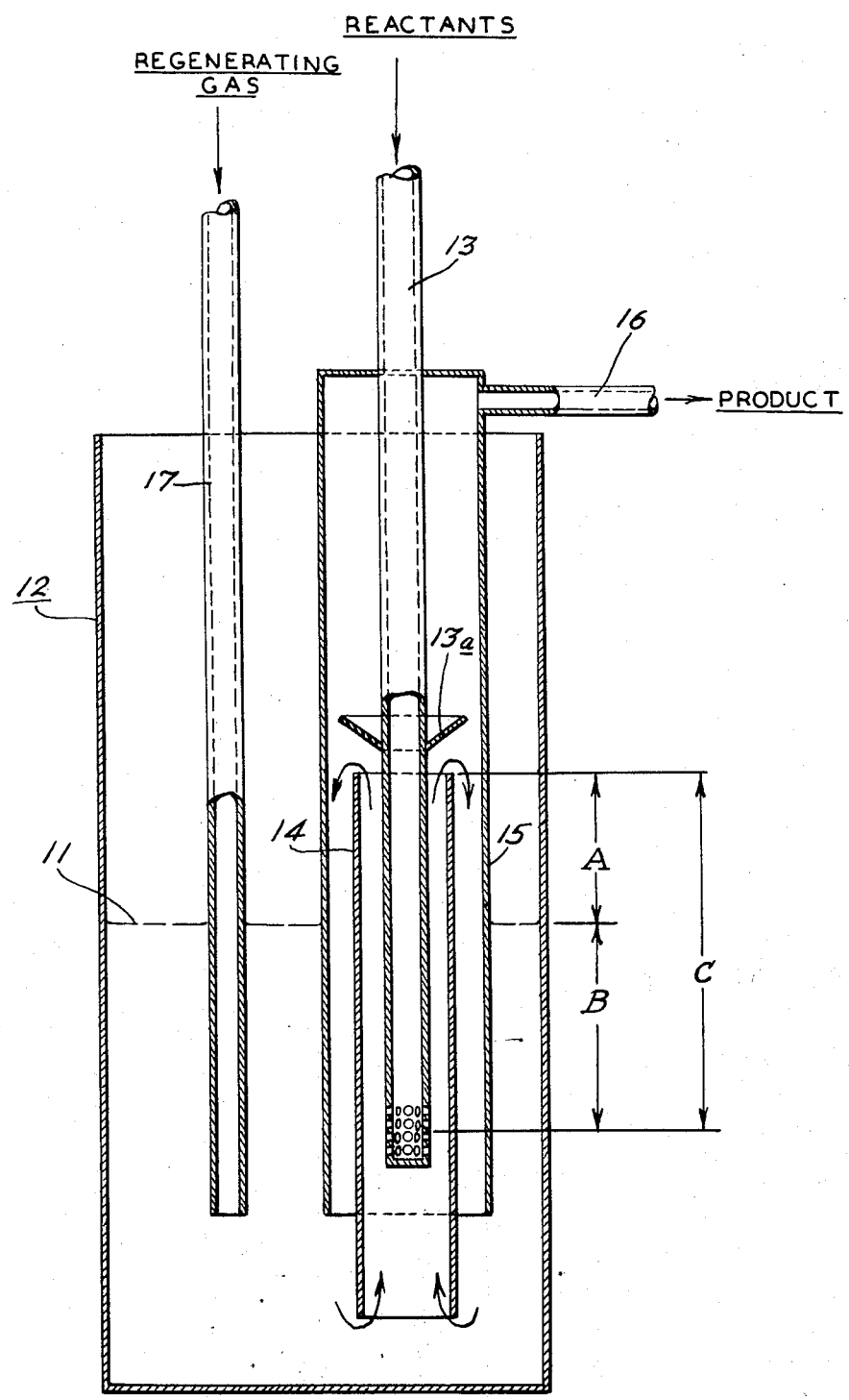

3,803,205
PRODUCTION OF AROMATIC NITRILES BY AMMOXIDATION
Jer-Yu Shang and H. Smith Sipple, Jr., Wilmington, Del., assignors to Sun Research and Development Co., Philadelphia, Pa.
Filed May 15, 1972, Ser. No. 255,876
Int. Cl. C07c *121/02*
U.S. Cl. 260—465 C    2 Claims

ABSTRACT OF THE DISCLOSURE

A continuous process for carrying out reactions in a molten salt which acts as a reaction catalyst by feeding reactant gases to the salt in a manner which lifts spent salt away from fresh reactant gases and fresh molten salt, and effecting regeneration of the circulating spent salt.

---

It is known in the art to carry out numerous types of reactions in a molten salt medium. For example, it is known that hydrocarbons such as o-xylene may be oxidized to the corresponding anhydrides in a melt composed of a eutectic mixture of vanadium pentoxide and potassium sulfate (Satterfield and Loftus, A. I. Ch. E. Journal, 11, No. 6, p. 1103, 1965). Other reactions such as halogenations, alkylations, isomerization and the like are also adaptable to molten salt reactions. In such processes as carried out heretofore, the reaction is made to occur in one reactor and regeneration of the salt in a second system.

This invention provides a process which enables reaction and regeneration of the molten salt catalyst to occur in a single unit and thus provides a continuous, highly efficient process for molten salt reactions. In accord with the invention a continuous process is provided for carrying out reactions in a molten salt which acts as a reaction catalyst by feeding reactant gases to said salt to effect reaction, entraining spent and unspent molten salt in product and unconverted reactant gases, separating entrained salt from said entraining gases, conducting said separated salt to an area to effect regeneration and circulating said regenerated salt to the reaction area. In a specific embodiment, the process provides for continuously carrying out reactions in a molten salt which acts as catalyst for said reactions and which requires regeneration by feeding gaseous reactants through a vertical gas-lift conduit partially submerged in said molten salt contained in a suitable reaction vessel at reaction temperature, the reactant gases emerging from the bottom of said conduit reacting upon contact with said salt, excess reactant and gaseous products entraining and carrying said molten salt upwardly above the level of the body of said molten salt in said reactor in the annular space between the outer surface of said conduit and a concentric first sleeve surrounding said conduit and immersed in said salt to a level below that of said conduit, said lifted salt spilling over said concentric sleeve and returning to the body of molten salt in the reactor by falling in the annular space between said first sleeve and a second concentric sleeve surrounding said first sleeve and immersed in said molten salt to a level between said first sleeve and said gas-lift conduit, the molten salt being regenerated by regenerating gases passed into the body of molten salt through a separate conduit submerged in said salt and in spaced relationship to the second sleeve, whereby circulation of said molten salt is achieved to bring spent catalyst in the vicinity of said regenerating gases and return regenerated salt to the vicinity of said reaction area.

In order to further describe the process of the invention, reference is made to the drawing. Molten salt 11 is contained in a vessel 12 and submerged in said salt is a vertical conduit 13 which serves as an inlet for the gaseous reactants. The immersed end of this conduit is preferably fitted with a sparging device to permit smooth flow of gases into the molten salt. This conduit 13 also acts as a gas-lift in that molten salt is entrained in the gases which rise after entering the molten salt. Concentric with the gas-lift conduit 13 is a sleeve 14 which extends from above the level of the molten salt to a depth in the molten salt below that of the gas-lift conduit 13. A second sleeve 15 concentric with sleeve 14 is also immersed in the molten salt to a level between that of the conduit 13 and the first sleeve 14. Optionally, a baffle 13a is positioned above sleeve 14 which will serve to prevent escape of the entrained salt by knocking down the entrained salt which has been carried upwardly through the annular space between sleeve 14 and the vertical conduit 13. The top of the second sleeve 15 is in sealing relationship with the gas-lift conduit 13 and is provided with an outlet line 16 for removal of product and unconverted reactant gases. A conduit 17 in spaced relation to the second sleeve 15 is also immersed in the molten salt to a level approximate to that of the second sleeve and serves as an inlet for regenerating gases. This conduit 17 may also be fitted with a sparging device.

The above-described system is useful for numerous types of continuous molten salt reactions, but is preferably used with oxidation and most preferably with ammoxidation reactions whereby alkyl-substituted aromatic hydrocarbons are converted to nitriles. In order to further illustrate operation of the process of the invention the following procedure for ammoxidation of hydrocarbons is given A gaseous mixture of hydrocarbon (e.g., p-xylene) and ammonia at a mole ratio of from about 1:3 to about 1:4 is introduced through conduit 13 and reacts as it contacts a catalyst consisting essentially of a eutectic mixture of $V_2O_5$ (61 mole percent) and $K_2O$ (39 mole percent) held molten above its melting point of 390° C. in vessel 11. As the gaseous nitrile products and unreacted hydrocarbons rise in the annular space between conduit 13 and sleeve 14, they entrain droplets of molten salt catalyst which rise with the gases. At the top of sleeve 14 the gases continue to rise and are taken from the system through outlet 16 after which the nitrile is separated and handled in the usual manner and unreacted hydrocarbon is recycled to the reactor. The entrained droplets of molten catalyst salt spill over the top of sleeve 14 and fall through the annular space between sleeve 14 and the second sleeve 15 joining the main body of molten salt at the bottom of second sleeve 15. If the upward flow of entrained salt is sufficiently strong, baffle 13a serves to knock down the molten salt. The annular space through which the entrained salt falls is kept free of the main body of molten salt by the pressure generated by the reactant and product gases in the system. The pressure required will, of course, depend upon the height of the molten salt and the submergence of conduit 13 and sleeve 14. Reference is again made to the drawing where A is the extent of lift of the entrained molten salt and B is the depth of submergence of conduit 13 (the lower level is shown as an average on a line perpendicular to the center of the sparger as some of the reactant gases will flow from the top and some from the bottom of the sparger). The sum of A and B, shown as C, is the elevation to which the molten salt is raised by the gases. The submergence B, and the lift A, have a relationship in that the ratio of molten salt density to the two-phase gas-molten salt mixture density is inversely proportional to the height of elevation C and the height of submergence B. The minimum lifting-gas pressure is the static head of submergence which is the product of molten salt density and the depth of submergence. It has been found that for 12 inches of elevation and 6 inches of submergence the system is operated under 3 p.s.i.g. pressure of reaction gases. As a rule of thumb, the lifting-gas pressure should be twice that of static head of submergence. As the rate of the reaction on the lifting gases increases, the density of the two-phase mixture (gases and molten salt) decreases. Consequently, the elevation C increases. This will have an effect on the residence time inside the reactor. However, the length of the sleeve 14 will control the exact residence time of the reaction gases. It has been found that about 3 p.s.i.g. of reaction gases pressure is effectively used in the system.

The salt falling through the annular space joins the main body of salt at the base of sleeve 15, and it is circulated toward the regenerating gas (air) which flows into the molten salt and causes a tangential motion to insure good mixing and contact. Optionally, supplemental means for aiding circulation may be employed. As the spent eutectic salt becomes regenerated a molten salt flow pattern is set up which causes the regenerated salt to migrate towards the bottom of sleeve 14 where it again enters the reaction area and the cycle is repeated. It will be understood that as the catalyst is used in the reaction it becomes depleted in catalytic activity. This is a chemical reaction which effects a composition change in the molten salt and such change may lead to soldification of solid products. It is important that a major amount of the salt remain molten to provide a liquid medium and this is accomplished by maintaining the contact time of the reactant gases with the molten salt relatively short. In actual practice, no serious problems develop, but good technique requires such contact time to be less than about fifteen minutes. In the case where the molten salt is an eutectic composition an additional safeguard is to operate the system at a temperature of about 50° C. above the eutectic temperature. Thus, for an ammoxidation system where the molten salt is a eutectic mixture of $K_2O$ and $V_2O_5$ (M.P. 390° C.) the system will be operated at about 440° C.

Following the above procedure a gaseous mixture of p-xylene and ammonia in a molar ratio of 4:1 is introduced to the system through conduit 13 fitted at its bottom with a porous dispenser, the catalyst salt of eutectic $V_2O_5/K_2O$ being kept molten at about 440° to about 450° C. by maintaining a shell temperature for vessel 11 at 485° C. Air at about 400° C. is used as a regenerating gas and is fed through conduit 17. Product and unconverted hydrocarbon is taken off through outlet 16 which is held at a temperature of about 400° C. Analysis of the product vapors indicate a ten percent conversion to nitrile products.

The invention claimed is:

1. A process for continuously carrying out ammoxidation of alkyl-substituted aromatic hydrocarbons to nitriles in a molten salt which acts as catalyst for said reactions and which requires regeneration, which process comprises feeding gaseous aromatic hydrocarbon and ammonia as reactants through a vertical gas-lift conduit partially submerged in a molten salt comprised of a eutectic mixture of $V_2O_5$ and $K_2O$ contained in a reaction vessel at a temperature of about 390° C. to about 440° C., the reactant gases emerging from the bottom of said conduit reacting upon contact with said salt, excess reactant and gaseous nitrile products entraining and carrying said molten salt upwardly above the level of the body of said molten salt in said reactor in the annular space between the outer surface of said conduit and a concentric first sleeve surrounding said conduit and immersed in said salt to a level below that of said conduit, said lifted salt spilling over said concentric sleeve and returning to the body of molten salt in the reactor by falling in the annular space between said first sleeve and a second concentric sleeve surrounding said first sleeve and immersed in said molten salt to a level between said first sleeve and said gas-lift conduit, spent salt in said body of molten salt being regenerated by air passed into the body of molten salt through a separate conduit submerged in said salt and in spaced relation to said second sleeve, whereby circulation of said molten salt is achieved to bring spent catalyst in the vicinity of said regenerating gases and return regenerated salt to the vicinity of said reaction area.

2. The process of claim 1 where the reactant gases comprise p-xylene and ammonia.

References Cited

UNITED STATES PATENTS

| | | | |
|---|---|---|---|
| 3,652,638 | 3/1972 | Riegel et al. | 260—465 X |
| 3,395,159 | 7/1968 | Levine | 252—461 X |

LEWIS GOTTS, Primary Examiner

D. H. TORRENCE, Assistant Examiner

U.S. Cl. X.R.

252—461